(No Model.)

T. D. RUGGLES.
OIL CUP.

No. 259,925. Patented June 20, 1882.

Witnesses:
J. A. Rutherford
A. H. Norris

Inventor:
Thomas D. Ruggles,
by C. P. Humphrey
Atty.

UNITED STATES PATENT OFFICE.

THOMAS D. RUGGLES, OF KENT, OHIO, ASSIGNOR OF ONE-HALF TO CHARLES C. BYERS, OF MEADVILLE, PENNSYLVANIA.

OIL-CUP.

SPECIFICATION forming part of Letters Patent No. 259,925, dated June 20, 1882.

Application filed May 5, 1882. (No model.)

*To all whom it may concern:*

Be it known that I, THOMAS D. RUGGLES, of Kent, in the county of Portage and State of Ohio, have invented a new and useful Improvement in Oil-Cups, of which the following is a specification.

My invention relates to improvements in oil-cups adapted to slowly feed oil to sliding surfaces. Heretofore such cups have consisted of a smaller closed vessel of metal, or glass and metal, adapted to contain lubricating substance, and provided with a slender duct leading through the nipple by which it is attached to the machine to the surface to be lubricated. The objection to this is that a lubricant must be used which will flow at ordinary temperatures; and in the event of heating of the sliding surfaces this lubricant is not sufficiently dense to overcome the wear, but a lubricant which will liquefy at a higher degree of temperature—such as tallow—must be used.

The object of my invention is to overcome this objection, and I accomplish this by the mechanism set forth in the accompanying drawings, in which—

Figure 1:
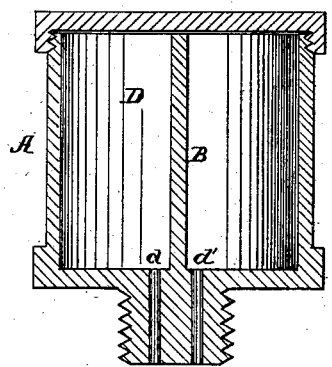
Figure 3:
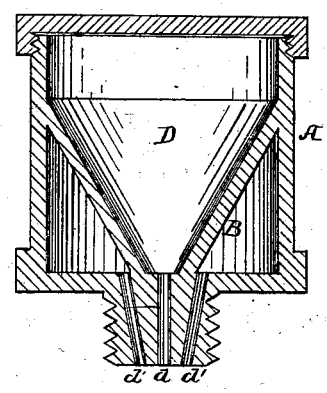
Figure 2:
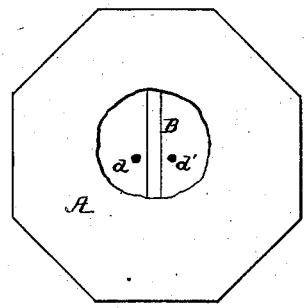

Figure 1 is a central vertical section of an oil-cup embodying my invention; Fig. 2, a plan of Fig. 1; Fig. 3, another form of oil-cup shown in vertical central section, and Fig. 4 a plan of Fig. 3.

The cup A is divided by the partition B into two compartments, in one of which is placed a lubricant fluid at ordinary temperatures and in the other a lubricant which will liquefy when raised to a higher degree of heat—as common oil in one and tallow in the other. Separate ducts *d d'* lead through the nipple to the wearing-surfaces.

At ordinary temperatures the tallow is solid and the oil alone escapes to the journals; but if the journal begins to heat it melts the tallow, which, escaping through the duct, lubricates the cutting-surfaces and relieves the wear.

Figure 4:
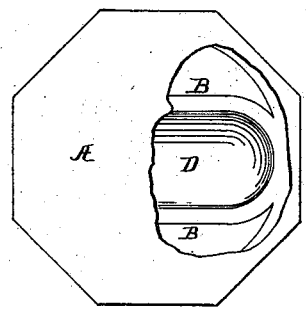

In Figs. 3 and 4 the oil-cup D is funnel-shaped and placed inside of the tallow-cup E; but otherwise its operation is the same as the other.

It is obvious that the ducts from the compartments may unite in one before reaching the journal; but the other arrangement will be found preferable.

I claim—

1. An oil-cup having two or more compartments, each provided with a separate duct leading to the wearing-surfaces, substantially as and for the purpose hereinbefore set forth.

2. An oil-cup having two or more compartments, each provided with a separate duct, said ducts uniting before reaching the wearing-surfaces, substantially as hereinbefore described, and for the purpose specified.

In testimony that I claim the foregoing I have hereunto set my hand this 28th day of April, A. D. 1882.

THOMAS D. RUGGLES.

Witnesses:
K. W. MAGAW,
W. W. PATTON.